United States Patent
Kariya et al.

(10) Patent No.: US 7,418,322 B2
(45) Date of Patent: Aug. 26, 2008

(54) EXHAUST TEMPERATURE SENSOR MALFUNCTION DETECTION APPARATUS

(75) Inventors: Yasuhiro Kariya, Obu (JP); Tsukasa Kuboshima, Okazaki (JP)

(73) Assignee: DENSO Corporation, Kariya (JP)

( * ) Notice: Subject to any disclaimer, the term of this patent is extended or adjusted under 35 U.S.C. 154(b) by 141 days.

(21) Appl. No.: 10/949,193

(22) Filed: Sep. 27, 2004

(65) Prior Publication Data

US 2005/0102076 A1    May 12, 2005

(30) Foreign Application Priority Data

Nov. 10, 2003    (JP)    ............................... 2003-379557

(51) Int. Cl.
  *G06F 19/00* (2006.01)
  *G06F 7/00* (2006.01)
  *G01M 17/00* (2006.01)

(52) U.S. Cl. ....................................................... 701/34
(58) Field of Classification Search .................... 701/34
  See application file for complete search history.

(56) References Cited

U.S. PATENT DOCUMENTS

| | | | | |
|---|---|---|---|---|
| 5,107,246 A | * | 4/1992 | Mogaki | ........................ 340/449 |
| 5,211,010 A | | 5/1993 | Hirota | |
| 5,388,454 A | * | 2/1995 | Kuroda et al. | ............... 73/118.1 |
| 5,848,381 A | * | 12/1998 | Ishii et al. | ........................ 702/99 |
| 5,995,887 A | * | 11/1999 | Hathaway et al. | .............. 701/34 |
| 6,131,446 A | * | 10/2000 | Schnaibel et al. | ........... 73/118.1 |
| 6,684,154 B2 | * | 1/2004 | Isobe et al. | .................. 701/114 |

FOREIGN PATENT DOCUMENTS

JP    1-216009    8/1989

OTHER PUBLICATIONS

P0546—Exhaust Gas Temperature Sensor Circuit Malfunction (High Input), available @ http://www.fastwrx.com/p0exgastesec.html, last accessed Apr. 13, 2008.*

* cited by examiner

*Primary Examiner*—Mary Cheung
*Assistant Examiner*—Daniel L Greene
(74) *Attorney, Agent, or Firm*—Nixon & Vanderhye P.C.

(57) ABSTRACT

In an exhaust cleaning system including a DPF in exhaust passages, a pair of temperature sensors is disposed upstream and downstream the filter to detect upstream and downstream exhaust temperatures. An electronic control unit estimates a downstream exhaust temperature from the actual upstream exhaust temperature when an engine is in a predetermined condition such as a cold-start condition or a high speed and high load condition, in which no catalytic reaction heat is generated in the DPF. The control unit then compares the estimated downstream temperature with the actually detected downstream temperature, and determines an exhaust temperature senor malfunction if the difference between the compared temperatures are large.

20 Claims, 6 Drawing Sheets

EXHAUST TEMPERATURE SENSOR MALFUNCTION DETECTION APPARATUS

CROSS REFERENCE TO RELATED APPLICATION

This application is based on and incorporates herein by reference Japanese Patent Application No. 2003-379557 filed on Nov. 10, 2003.

FIELD OF THE INVENTION

The present invention relates to an apparatus for detecting malfunction of an exhaust temperature sensor provided in an exhaust passage of an internal combustion engine having an exhaust cleaning device in the exhaust passage.

BACKGROUND OF THE INVENTION

Recent internal combustion engines have various exhaust cleaning devices such as an oxidizing catalyst, NOx catalyst or three-way (oxidizing and reducing) catalyst. Diesel engines have diesel particulate filters (DPF), as an exhaust cleaning device, for collecting particulates in the exhaust. The DPF is regenerated by burning the collected particulates. The DPF carries oxidizing catalyst thereon so that the particulates are burned stably under low regenerating temperatures.

For an efficient operation, the temperature of the exhaust cleaning device should preferably be maintained in a temperature range (200° C.-700° C.) in which the catalyst is maintained sufficiently activated and no catalyst damage due to excessive temperatures is caused. For regenerating the DPF, unburned HC is supplied by post injection to raise the DPF temperature to be above 600° C. The DPF may become excessively heated as a result of burning of the particulates, resulting in deterioration of the catalyst or damage to filter components.

Various catalyst monitoring devices are proposed. For instance, in U.S. Pat. No. 5,211,010 (JP-A-4-224221), an exhaust temperature sensor is provided downstream an NOx reducing catalyst and regulates catalyst temperatures by increasing or decreasing air excess ratio in the exhaust based on the detected exhaust temperature. Further, in JP-A-1-216009 (JP 2593506), exhaust temperature sensors are provided both upstream and downstream a catalyst and determines catalyst deterioration based on a comparison of the detected catalyst upstream and downstream temperatures. The catalyst or DPF monitoring will become impossible if the exhaust temperature sensors fail to operate normally.

SUMMARY OF THE INVENTION

It is an object of the present invention to provide an exhaust temperature sensor malfunction detecting apparatus, which detects malfunctions of the exhaust temperature sensor and outputs detection result to be used for enhancing the stability and reliability of engine exhaust cleaning devices.

According to the present invention, an exhaust temperature sensor malfunction detecting apparatus comprises an upstream temperature sensor and a downstream temperature sensor disposed in an exhaust passage of an engine for detecting an upstream temperature and a downstream temperature of exhaust gas. An electronic control unit determines whether an engine is in a predetermined condition, and estimates a downstream temperature based on the detected upstream temperature. The control unit determines a temperature sensor malfunction using the detected downstream temperature and the estimated downstream temperature.

The upstream temperature sensor and the downstream temperature sensor are disposed upstream and downstream an exhaust cleaning device including a catalyst, respectively. The temperature sensor determination may be made by comparing the two downstream temperatures or the time change of the two downstream temperatures.

Preferably, the predetermined condition includes at least an engine cold-start condition and a high speed and high load condition of the engine. In the cold-start condition, the catalyst is not activated and hence little catalytic reaction heat is generated even though unburned HC components are produced largely. In the high speed and high load condition, little unburned HC components are produced and hence little catalytic reaction heat is generated even if the catalyst is activated. Thus, in those conditions, the downstream exhaust temperature can be estimated rather easily because the exhaust gas flow is not influenced by the catalytic reaction heat.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
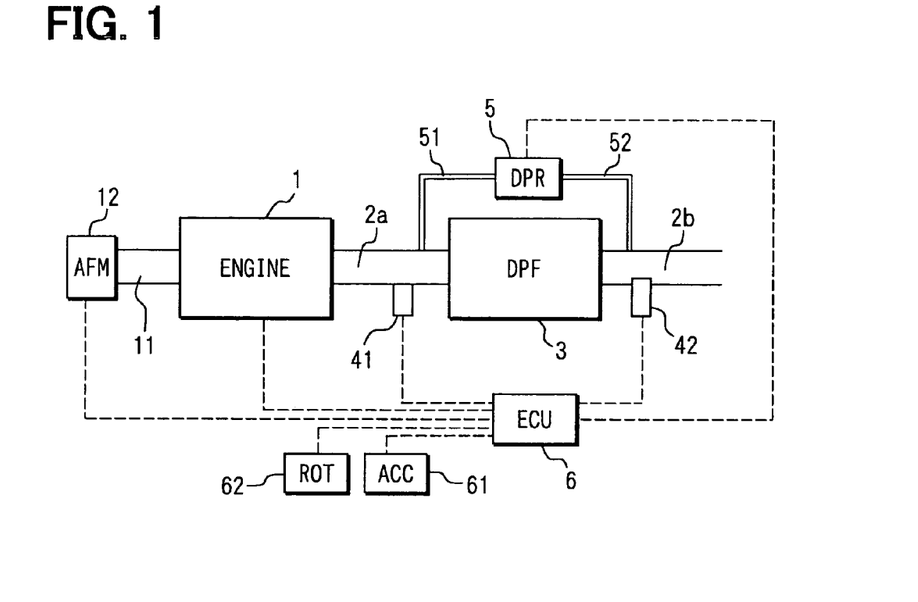
FIG. 1 is a schematic diagram showing an exhaust temperature sensor malfunction detecting apparatus according to a first embodiment of the present invention.

Referring first to FIG. 1, an internal combustion engine system includes a diesel engine 1 having an air intake passage 11 and exhaust passages 2a, 2b. A diesel particulate filter (DPF) 3 is provided as an exhaust cleaning device between the passages 2a and 2b. The DPF 3 includes oxidizing catalyst thereon. More specifically, the DPF 3 is made of heat-resistant ceramics such as cordierite formed in a honeycomb structure. Multiple cells of the DPF 3, which are used as gas passages, are closed at an inlet or outlet alternately. Oxidizing catalyst such as platinum (Pt) is coated on cell wall surfaces.

Exhaust gas produced from the engine 1 flows downward passing through porous partition walls of the DPF3. Particulates in the exhaust gas are collected and accumulated while passing through the DPF3.

An exhaust temperature sensor 41 is provided as an upstream temperature sensor on the exhaust passage 2a to detect exhaust temperatures at the upstream of the DPF 3. An exhaust temperature sensor 42 is provided as a downstream temperature sensor on the exhaust passage 2b to detect temperatures at the downstream of the DPF 3. Those temperature sensors 41 and 42 are connected to an electronic control unit (ECU) 6 and apply output signals indicative of the detected upstream and downstream temperatures. An airflow sensor 12 is provided in the intake passage 11 and connected to the ECU 6 to apply an output signal indicative of the detected intake airflow quantity.

A differential pressure sensor 5 is provided in parallel to the DPF 3 and connected to the exhaust passages 2a and 2b through pipes 51 and 52. The differential pressure sensor 5 detects pressure differences between the upstream exhaust pressure and the downstream exhaust pressure and applies an output signal indicative of the detected differential pressure to the ECU 6. Since the exhaust pressures in the upstream and the downstream of the DPF 3 varies with the quantity of particulates collected in the DPF 3, the differential pressure increases as the collected particulate quantity increases.

An accelerator sensor 61, a rotation sensor 62 and other sensors (not shown) are also connected to the ECU 6 to apply respective output signals indicative of engine rotation speeds, accelerator positions and other conditions to the ECU 6. The ECU 6 calculates optimum fuel injection quantities, ignition timings, injection pressures and the like based on output signals of those sensors 12, 61 and 62, so that the engine 1 is feedback-controlled in the conventional manner.

In addition, based on the output signals of the airflow sensor 12, differential pressure sensor 5 and exhaust temperature sensors 41, 42, the ECU 6 controls regeneration of the DPF 3 by calculating quantities of particulates collected and accumulated in the DPF 3 and determining whether the accumulated particulate quantity (PM).

The ECU 6 further detects malfunction of the exhaust temperature sensors 41 and 42. Specifically, the ECU 6 estimates a DPF downstream temperature from the upstream exhaust temperature detected by the upstream temperature sensor 41, and compares the estimated downstream temperature with the downstream temperature detected by the downstream temperature sensor 42. The ECU 6 determines that either the upstream sensor 41 or the downstream sensor 42 is in malfunction, if the compared temperatures differ largely. The ECU 6 executes this processing for malfunction detection, when the engine 1 operates under a predetermined condition range.

This range may be an engine operation range in which influence of HC oxidizing and burning heat is negligibly small, for instance, immediately after the engine cold-start in which the DPF 3 is not heated to sufficiently activate the catalyst. This range may be a high speed and high load operation of the engine 1.

Figure 2:
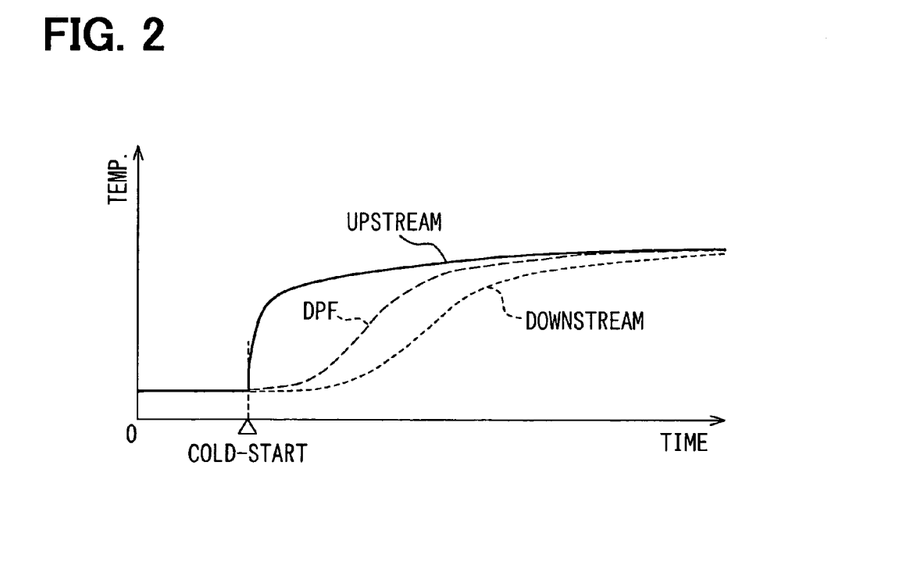
FIG. 2 is a graph showing temperature changes in an exhaust passage in case of an engine cold-start.

The exhaust temperatures change differently depending on the location in the exhaust passage as shown in FIG. 2, when the engine 1 is started under a still cold state (cold-start) in which the catalyst in the DPF 3 is not yet activated. Specifically, after the engine 1 is cold-started, the exhaust temperature upstream the DPF 3 rises immediately but the exhaust temperatures in the DPF 3 and downstream the DPF 3 rise slowly with some time delays, respectively.

This delays are caused because the DPF 3 is a ceramic structure which has a large heat capacity. Since the catalyst in the DPF 3 is not yet activated immediately after the engine cold-start, HC is not burned by oxidization by the catalyst. Therefore, the exhaust temperatures in the DPF 3 and downstream the DPF 3 rises to the similar level as the upstream exhaust temperature after the respective delay times.

Figure 3:
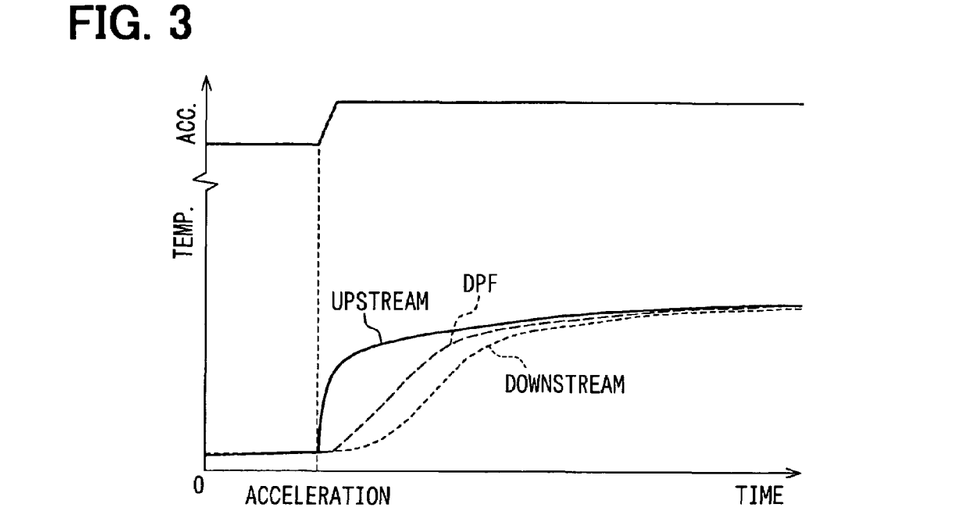
FIG. 3 is a graph showing temperature changes in an exhaust passage in case of an engine high speed and high load condition.

The exhaust temperatures in the DPF 3, upstream and downstream the DPF 3 also change differently as shown in FIG. 3, when the engine 1 is accelerated by an accelerator (ACC) and operated in the high speed and high load condition. Although the exhaust temperature upstream the DPF 3 rises immediately without delay, the exhaust temperatures in the DPF 3 and downstream the DPF 3 rise slowly to the similar level as the upstream exhaust temperature after some time delays respectively.

This delays are caused, because little HC is exhausted from the engine 1 in the high speed and high load condition and oxidized by the catalyst in the DPF 3 even when the catalyst is in the activated state. In the high speed and high load condition, the temperatures in the DPF 3 and downstream the DPF 3 rises more quickly than in the cold-start case shown in FIG. 2.

Figure 5:
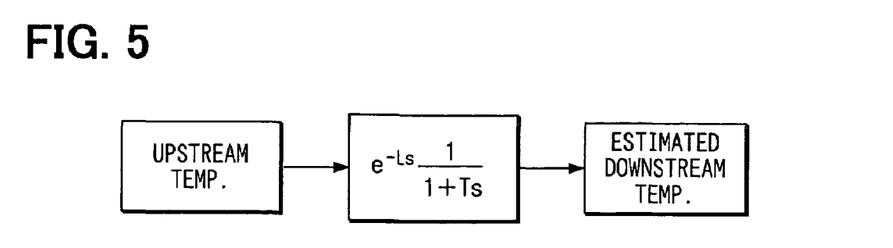
FIG. 5 is a mathematical model showing a method of estimating a downstream temperature.

Under the above two engine operating conditions, the relation between the upstream temperature change and the downstream temperature change is defined as a function of only a temperature change delay arising form the heat capacity of the DPF 3 and smoothing. This exhaust system is expressed as a transfer function of a first-order delay plus a dead time, that is, $e^{-Ls}/(1+Ts)$, as shown in FIG. 5. Here, T is a time constant of a first-order delay and L is a dead time. Thus, the exhaust temperature downstream the DPF 3 can be estimated from the exhaust temperature upstream the DPF 3 by using the transfer function defining the downstream temperature change relative to the upstream temperature change.

The estimated downstream exhaust temperature will generally equals the downstream exhaust temperature, as long as both exhaust temperature sensors 41 and 42 are normal. Therefore, the malfunction of the exhaust temperature sensors 41 and 42 can be detected by comparing the estimated downstream temperature and the downstream temperature actually detected by the downstream sensor 42. In one of the exhaust temperature sensors 41 and 42 is in malfunction, the compared two temperatures will differ largely.

Figure 4:
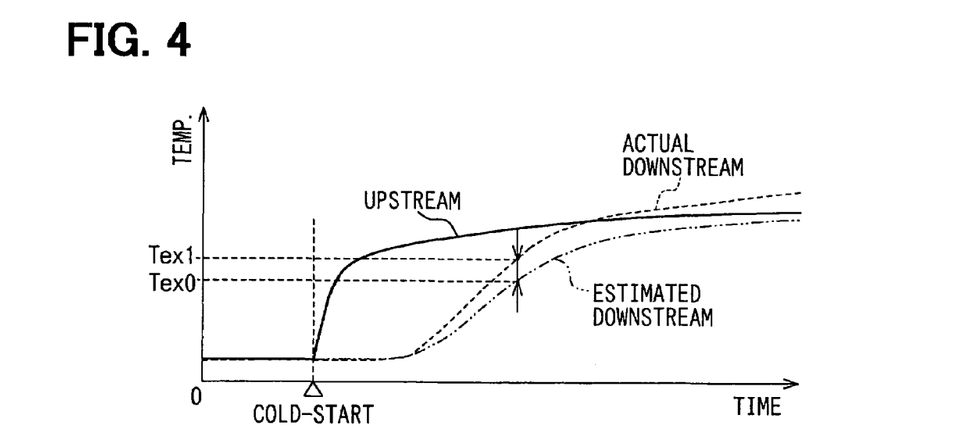
FIG. 4 is a graph showing changes of an estimated downstream temperature and a sensor output in case of a sensor malfunction.

FIG. 4 shows a case in which the downstream exhaust temperature sensor 42 has a malfunction. In this instance, the actual output characteristic of the downstream sensor 42 deviates to the higher temperature side relative to the estimated downstream temperature. Therefore, a temperature difference between an estimated downstream temperature Tex0 and the actually detected downstream temperature Tex1 is calculated. If the difference (|Tex1−Tex0|) is larger than a predetermined reference value Tref, malfunction is detected.

Figure 6:
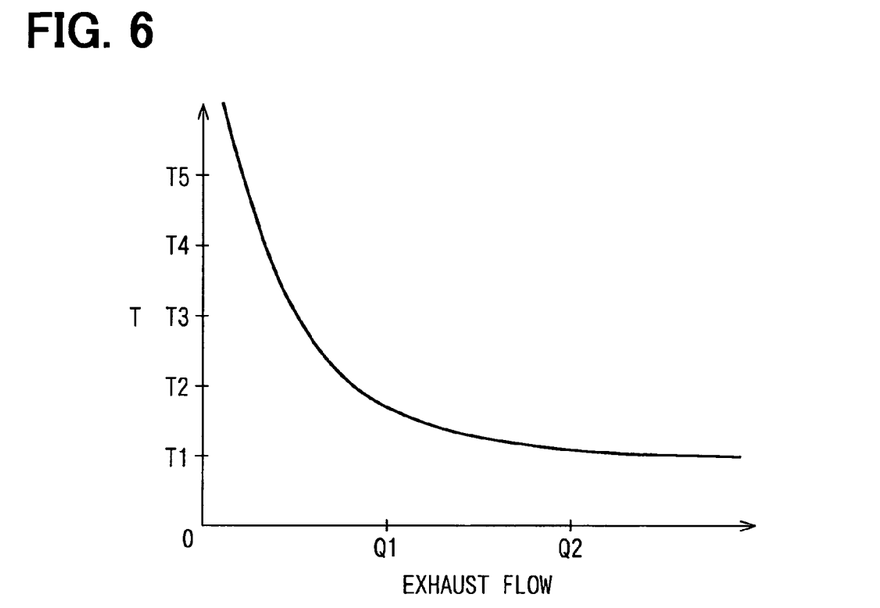
FIG. 6 is a graph showing a time constant change of a downstream temperature relative to an upstream temperature with respect to an exhaust gas flow quantity.
Figure 7:
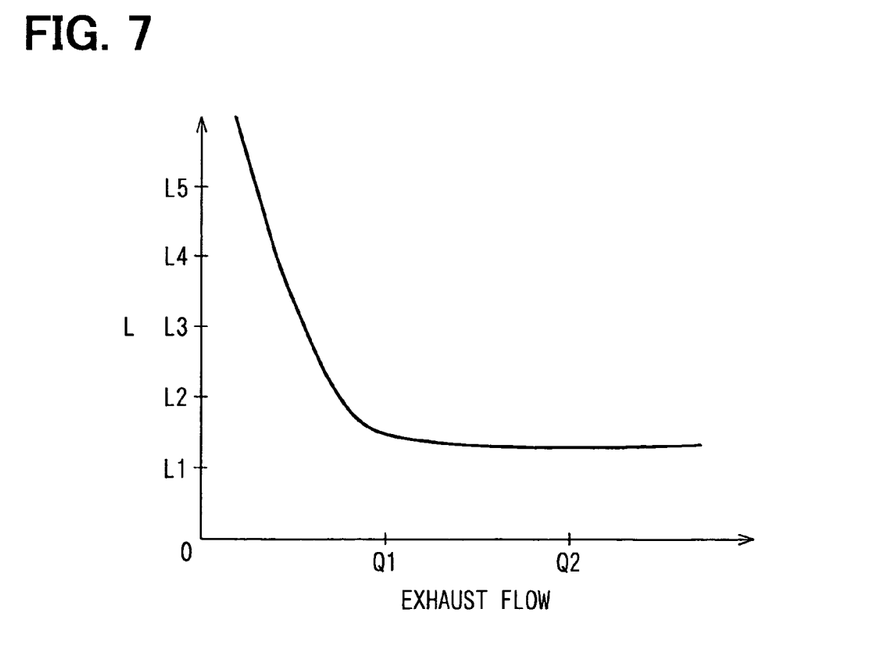
FIG. 7 is a graph showing a delay time change of a downstream temperature relative to an upstream temperature with respect to an exhaust gas flow quantity.

The relation between the upstream temperature change and the downstream temperature change varies with the exhaust flow quantity. Therefore, the time constant T of the first-order delay and the dead time L are varied as shown in FIGS. 6 and 7, respectively. These characteristics are determined experimentally. Specifically, both the time constant T and the dead time L are decreased remarkably as the exhaust flow quantity increases within a small flow quantity range (0 to Q1). This is because the heat transfer per unit time between the exhaust gas and the catalyst in the DPF 3 increases as the exhaust flow quantity increases. The time constant T and the dead time L becomes substantially unchanged once the exhaust flow quantity exceeds the small quantity range.

For this reason, in estimating the downstream exhaust temperature, the ECU 6 first calculates the exhaust flow quantity and sets the time constant T and the dead time L in correspondence with the calculated exhaust flow quantity, and finally calculates the estimated downstream exhaust temperature by using the transfer function (FIG. 5) and the variably set time constant T and dead time L.

Figure 8:
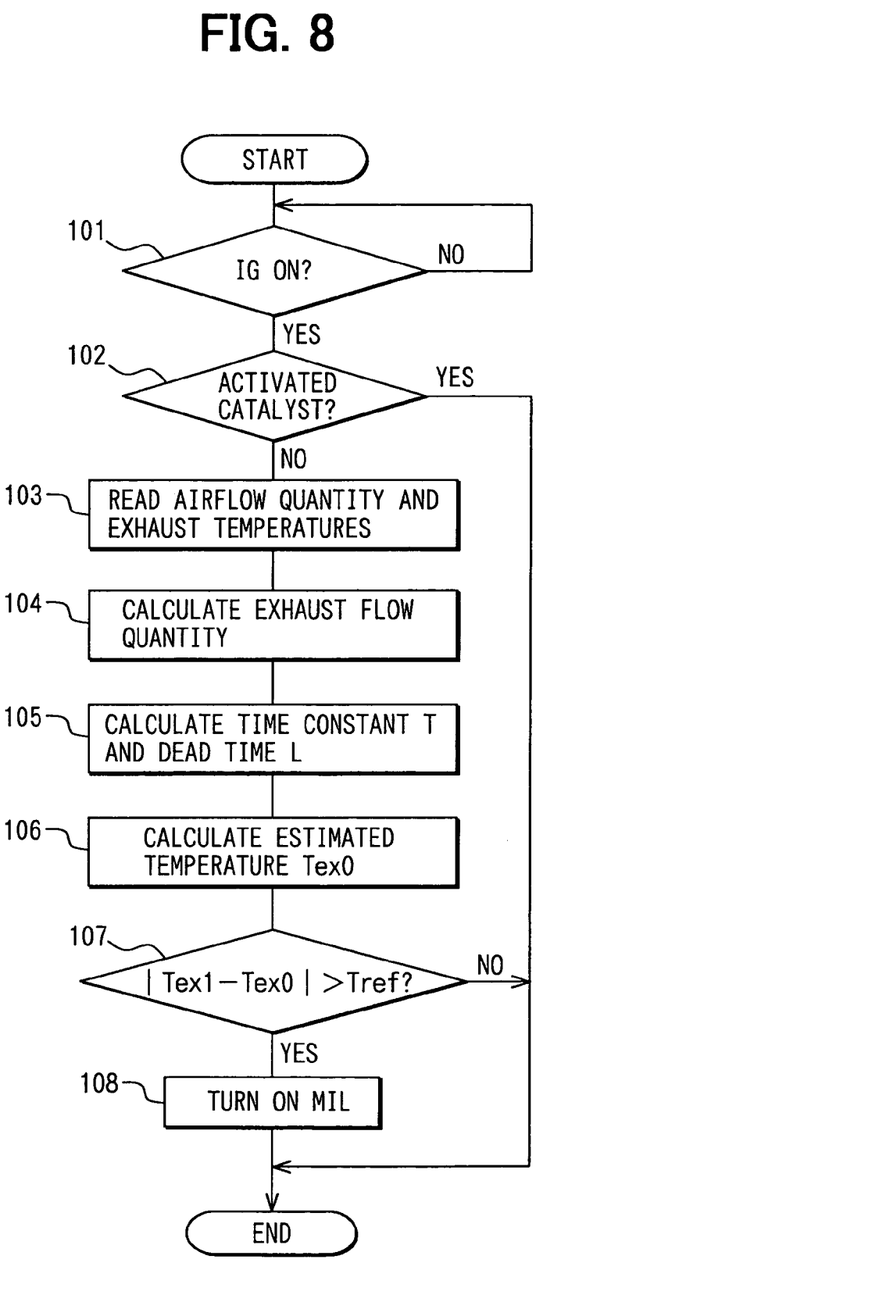
FIG. 8 is a flowchart showing a malfunction detection process executed in case of an engine cold-start condition in the first embodiment.
Figure 9:
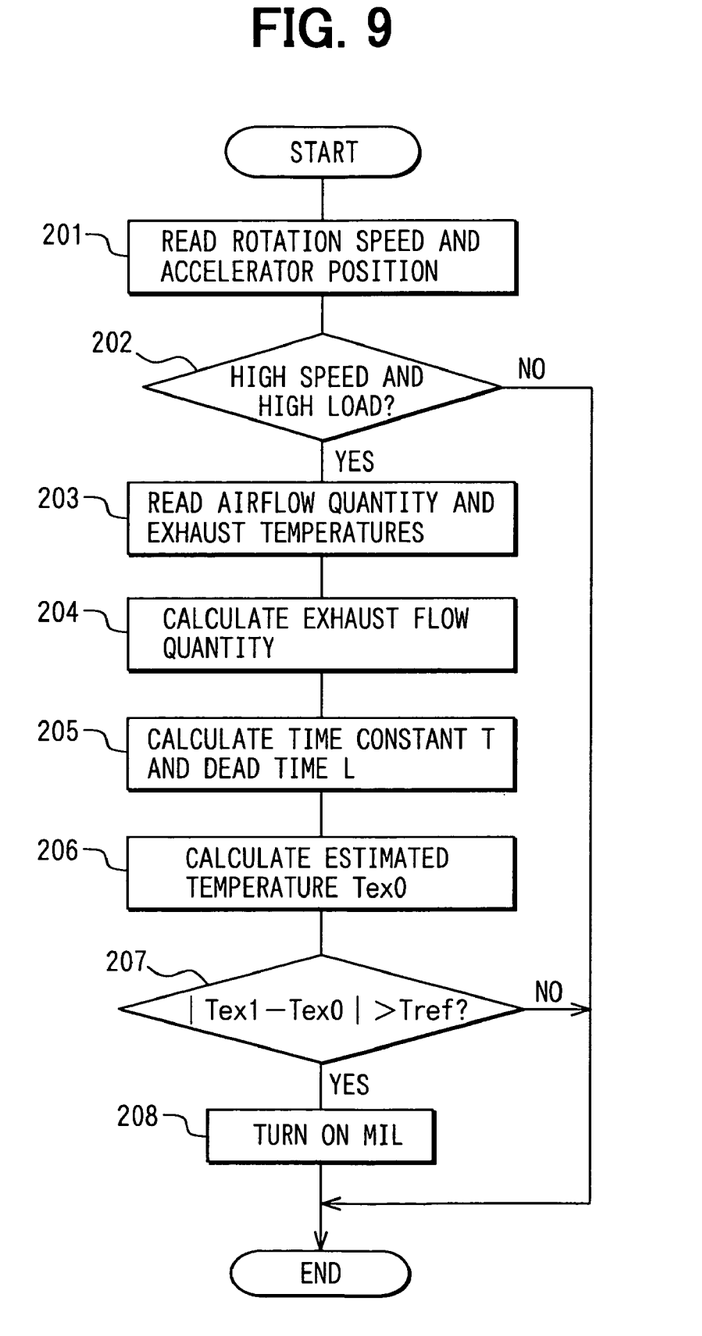
FIG. 9 is a flowchart showing a malfunction detection process executed in case of an engine high speed and high load condition in the first embodiment.

For the above malfunction detection operation, the ECU 6 is programmed to execute the processing shown in FIGS. 8 and 9, which are for the engine cold-start case and the high speed and high load case, respectively.

Referring to FIG. 8, ECU 6 first determines at step 101 whether the ignition switch (not shown) is ON indicative of the engine operation, and then determines at step 102 whether the catalyst is in activated condition. The catalyst is determined to be in the inactivated state when both the exhaust temperatures detected by the upstream temperature sensor and the downstream temperature sensor are lower than respective predetermined reference temperatures. The reference temperatures may be set in correspondence with the activation temperature of the catalyst used at 200° C. Alternatively, the catalyst inactivation state may be determined based on whether the engine coolant temperature is below 40° C. If the catalyst is determined to be in the activated state, the ECU 6 ends this processing.

The ECU 6 reads at step 103 the intake airflow quantity and upstream and downstream exhaust temperatures, which are detected by the airflow sensor 12 and exhaust temperature sensors 41, 42, respectively. Next at step 104, the exhaust flow quantity Q is calculated from the detected intake airflow quantity. As long as both quantities are detected in terms of the same unit of measurement, for instance, gram/second, the detected airflow quantity may be used as the exhaust flow quantity.

ECU 6 then calculates the time constant T and the dead time L at step 105 based on the calculated exhaust flow quantity Q. For this calculation, the characteristics of the time constant T and the dead time L relative to the exhaust flow quantity Q may be stored in the ECU 6 for use at step 105. The ECU 6 calculates at step 106 the estimated downstream exhaust temperature Tex0 based on the actually detected upstream exhaust temperature Tex1 by using the transfer function of FIG. 5.

The ECU 6 calculates the difference (absolute value) between the two downstream exhaust temperatures Tex0 and Tex1 and compares it with the predetermined reference Tref at step 107. If the difference is smaller than the reference, the ECU 6 determines that both exhaust temperature sensors 41 and 42 are determined to be normal. If the difference is larger than the reference, the ECU 6 determines that at least either exhaust temperature sensor 41 or 42 is in malfunction and turns on a malfunction indication light (MIL) at step 108.

Figure 10:
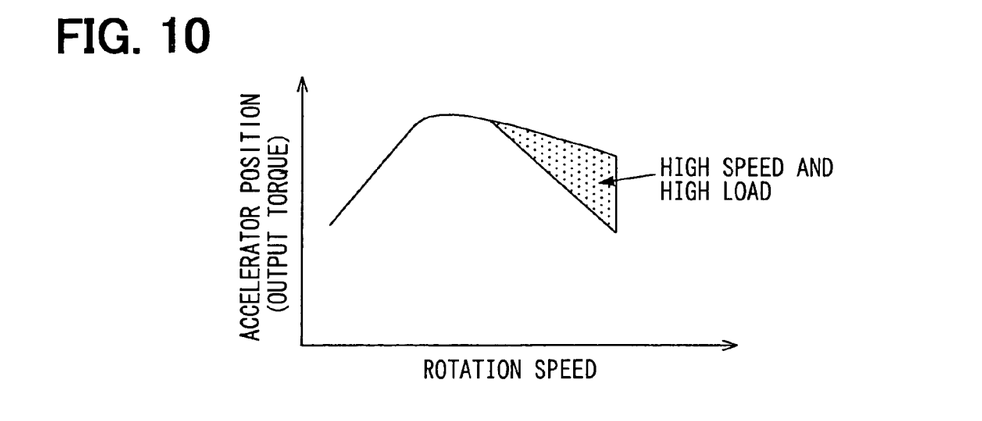
FIG. 10 is a graph showing a high speed and high load region in which HC emission is minimal.

In addition to the processing of FIG. 8, the ECU 6 reads at step 201 the accelerator position detected by the accelerator sensor 61 and the engine rotation speed detected by the rotation sensor 62. The ECU 6 then determines at step 202 whether the engine 1 is in the high speed and high load condition. This determination may be made by checking whether the detected engine rotation speed and accelerator position (output torque) are in the designated range shown in FIG. 10. If the engine 1 is determined to be not in the high speed and high load condition, the ECU 6 ends this processing.

If the engine 1 is determined to be in the high speed and high load condition, the ECU 6 executes steps 203 to 208 in the similar manner as the steps 103 to 108.

Specifically, the ECU 6 reads at step 203 the intake airflow quantity and upstream and downstream exhaust temperatures, which are detected by the airflow sensor 12 and exhaust temperature sensors 41, 42, respectively. Next at step 204, the exhaust flow quantity Q is calculated from the detected intake airflow quantity. ECU 6 then calculates the time constant T and the dead time L at step 205 based on the calculated exhaust flow quantity Q. For this calculation, the characteristics of the time constant T and the dead time L relative to the exhaust flow quantity Q may be stored in the ECU 6 for use at step 205. The ECU 6 calculates at step 206 the estimated downstream exhaust temperature Tex0 based on the actually detected upstream exhaust temperature Tex1 by using the transfer function of FIG. 5.

The ECU 6 calculates the difference (absolute value) between the two downstream exhaust temperatures Tex0 and Tex1 and compares it with the predetermined reference Tref at step 207. If the difference is smaller than the reference, the ECU 6 determines that both exhaust temperature sensors 41 and 42 are determined to be normal. If the difference is larger than the reference, the ECU 6 determines that at least either exhaust temperature sensor 41 or 42 is in malfunction and turns on a malfunction indication light (MIL) at step 208.

Figure 11:
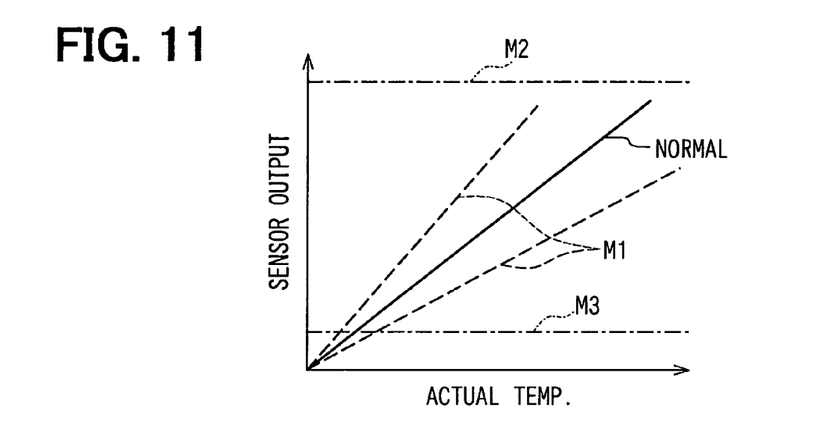
FIG. 11 is a graph showing malfunction modes of an exhaust temperature sensor.

According to the first embodiment, the malfunction of the exhaust temperature sensors 41 and 42 disposed upstream and downstream the DPF 3 can be detected with ease by monitoring the sensors 41 and 42 each other. Specifically, various failure modes M1 to M3 which are shown in FIG. 11 as deviating from the normal temperature sensor output characteristic can be detected. The failure mode M1 indicates deviations of gain (conversion ratio), M2 indicates shorting to a high potential side, and M3 indicates shorting to a low potential side.

It may be difficult to accurately detect malfunction of temperature sensors 41 and 42 in the case that the catalyst is disposed between the sensors 41 and 42, because the temperature downstream the catalyst is influenced by heat generated by the catalyst reaction. Therefore, in the first embodiment, the malfunction detection is limited to specific engine conditions, that is, engine cold-start condition and high speed and high load condition. Because the catalyst is inactive to burn the unburned HC under the engine cold-start condition and the unburned HC is least exhausted under the high speed and high load condition, the downstream exhaust temperature is not influenced by the heat of oxidizing HC. As a result, the downstream exhaust temperature can be estimated by using a simple transfer function.

Second Embodiment

Figure 12:
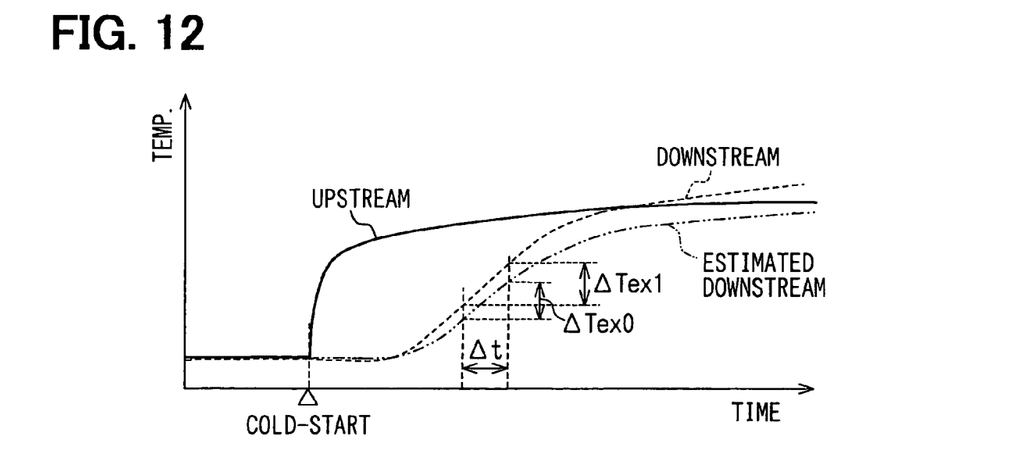
FIG. 12 is a graph showing changes of an estimated downstream temperature and a sensor output in case of a sensor malfunction according to a second embodiment of the present invention.

In this embodiment, as shown in FIG. 12, the ECU 6 calculates a temperature difference per unit time (temperature change) $\Delta Tex1/\Delta t$ in the downstream temperatures actually detected by the exhaust temperature sensor 42 and a temperature difference per unit time (temperature change) $\Delta Tex0/\Delta t$ in the estimated downstream temperatures are calculated. The ECU 6 then compares the two temperature difference, and determines the malfunction of either temperature sensor if the compared differences differ largely, $|\Delta Tex1/\Delta t - \Delta Tex0/\Delta t|$ >Tref2. This processing is attained when the engine 1 is in the cold-start condition and in the high speed and high load condition.

The present invention should not be limited to the disclosed embodiments but may be implemented in many other ways without departing from the spirit of the invention. For instance, in place of a DPF carrying an oxidizing catalyst, an exhaust cleaning device may be a DPF carrying other types of catalyst, only an oxidizing catalyst, NOx catalyst, three-way catalyst or the like. Further, a temperature sensor malfunction may be detected by estimating the exhaust upstream temperature from the exhaust downstream temperature detected by the downstream sensor.

What is claimed is:

1. An exhaust temperature sensor malfunction detecting apparatus for an engine having an exhaust cleaning device in an exhaust passage, comprising:

an upstream temperature sensor disposed in the exhaust passage for detecting an upstream temperature of exhaust gas at an upstream position of the exhaust cleaning device;

a downstream temperature sensor disposed downstream the upstream sensor in the exhaust passage for detecting a downstream temperature of the exhaust gas at a downstream position of the exhaust cleaning device;

engine operation detecting means for detecting an operation condition of the engine;

condition determining means for determining whether the engine is in a predetermined condition, the predetermined condition is a condition in which the exhaust cleaning device generates little catalytic reaction heat;

estimating means for estimating one of a downstream temperature and an upstream temperature of the exhaust gas based on one of the detected upstream temperature and the detected downstream temperature, respectively, when the engine is in the predetermined condition; and malfunction determining means for determining a temperature sensor malfunction based on a relation between the one of the detected downstream temperature and the detected upstream temperature and the one of the estimated downstream temperature and the estimated upstream temperature.

2. The exhaust temperature sensor malfunction detecting apparatus as in claim 1, wherein the predetermined condition includes at least one of an inactivated condition of a catalyst in the cleaning device and a high speed and high load condition of the engine.

3. The exhaust temperature sensor malfunction detecting apparatus as in claim 1, wherein the estimating means is further configured to use a predetermined transfer function which defines a relation between exhaust upstream temperature changes and exhaust downstream temperature changes.

4. The exhaust temperature sensor malfunction detecting apparatus as in claim 3, wherein the predetermined transfer function is expressed with a first-order delay and a dead time.

5. The exhaust temperature sensor malfunction detecting apparatus as in claim 4, wherein the first-order delay and the dead time are variable with exhaust flow quantity.

6. The exhaust temperature sensor malfunction detecting apparatus as in claim 1, wherein the malfunction determining means is configured to calculate a difference between the detected downstream temperature and the estimated downstream temperature and determines the malfunction based on the calculated difference.

7. The exhaust temperature sensor malfunction detecting apparatus as in claim 1, wherein the malfunction determining means is configured to calculate a difference per unit time between the detected downstream temperature and the estimated downstream temperature and determines the malfunction based on the calculated difference per unit time.

8. The exhaust temperature sensor malfunction detecting apparatus as in claim 1, wherein the cleaning device includes one of an oxidizing catalyst, a particulate filter having a catalyst, an NOx catalyst and a three-way catalyst.

9. The exhaust temperature sensor malfunction detecting apparatus as in claim 1, wherein the predetermined condition includes an inactivated condition of a catalyst in the cleaning device.

10. A method of detecting exhaust temperature sensor malfunction for an engine having an exhaust cleaning device in an exhaust passage, the method comprising:

disposing an upstream temperature sensor in the exhaust passage and detecting an upstream temperature of exhaust gas at an upstream position of the exhaust cleaning device using the upstream temperature sensor;

disposing a downstream temperature sensor downstream of the upstream sensor in the exhaust passage and detecting a downstream temperature of the exhaust gas at a downstream position of the exhaust cleaning device using the downstream temperature sensor;

detecting an operation condition of the engine;

determining whether the engine is in a predetermined condition, the predetermined condition is a condition in which the exhaust cleaning device generates little catalytic reaction heat;

estimating one of a downstream temperature and an upstream temperature of the exhaust gas based on one of the detected upstream temperature and the detected downstream temperature, respectively, when the engine is in the predetermined condition; and determining a temperature sensor malfunction based on a relation between the one of the detected downstream temperature and the detected upstream temperature and the one of the estimated downstream temperature and the estimated upstream temperature.

11. The method as in claim 10, wherein the predetermined condition includes at least one of an inactivated condition of a catalyst in the cleaning device and a high speed and high load condition of the engine.

12. The method as in claim 10, wherein a predetermined transfer function which defines a relation between exhaust upstream temperature changes and exhaust downstream temperature changes is used to estimate one of the downstream and upstream temperatures.

13. The method as in claim 12, wherein the predetermined transfer function is expressed with a first-order delay and a dead time.

14. The method as in claim 13, wherein the first-order delay and the dead time are varied with exhaust flow quantity.

15. The method as in claim 10, wherein a difference between the detected downstream temperature and the estimated downstream temperature is calculated and the malfunction is determined based on the calculated difference.

16. The method as in claim 10, wherein a difference per unit time between the detected downstream temperature and the estimated downstream temperature is calculated and the malfunction is determined based on the calculated difference per unit time.

17. The method as in claim 10, wherein the cleaning device includes one of an oxidizing catalyst, a particulate filter having a catalyst, an NOx catalyst and a three-way catalyst.

18. The exhaust temperature sensor malfunction detecting apparatus as in claim 9, wherein the inactivated condition of the catalyst is determined based on whether an engine coolant temperature is below 40° C.

19. The method as in claim 10, wherein the predetermined condition includes an inactivated condition of a catalyst in the cleaning device.

20. The method as in claim 19, wherein the inactivated condition of the catalyst is determined based on whether an engine coolant temperature is below 40° C.

* * * * *